Nov. 18, 1930.  J. W. ALLEN  1,781,829
COTTON CHOPPER
Filed June 25, 1929  2 Sheets-Sheet 1

John W. Allen, Inventor

By C. A. Snow & Co.
Attorneys.

Nov. 18, 1930. J. W. ALLEN 1,781,829
COTTON CHOPPER
Filed June 25, 1929 2 Sheets-Sheet 2

John W. Allen, Inventor

Patented Nov. 18, 1930

1,781,829

UNITED STATES PATENT OFFICE

JOHN W. ALLEN, OF FRESNO, CALIFORNIA

COTTON CHOPPER

Application filed June 25, 1929. Serial No. 373,563.

This invention relates to cotton choppers of the type wherein the chopping blades rotate in vertical planes.

The primary object of the invention is to provide means for automatically moving the chopping blades to their inactive positions above the ground surface when the machine is thrown out of operation, eliminating any possibility of damage to cotton plants by the blades dragging through the ground surface.

Another object of the invention is the provision of means operated simultaneously with the controlling lever of the machine, for accomplishing the movement of the chopping blades to their initial positions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
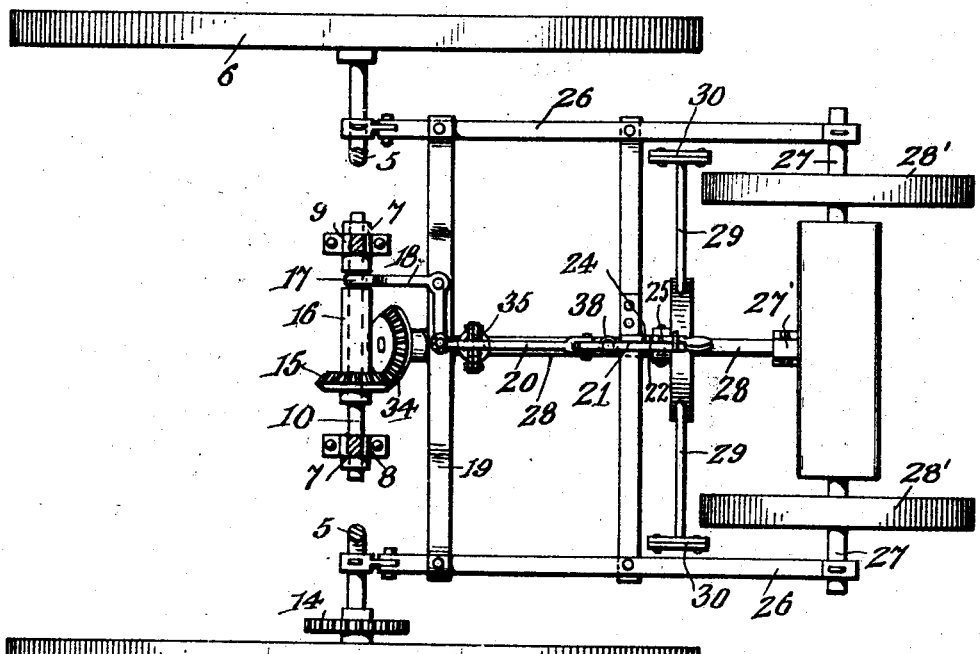
Figure 1 is a bottom plan view of a cotton chopper constructed in accordance with the invention, the axle being shown in section.
Figure 3:
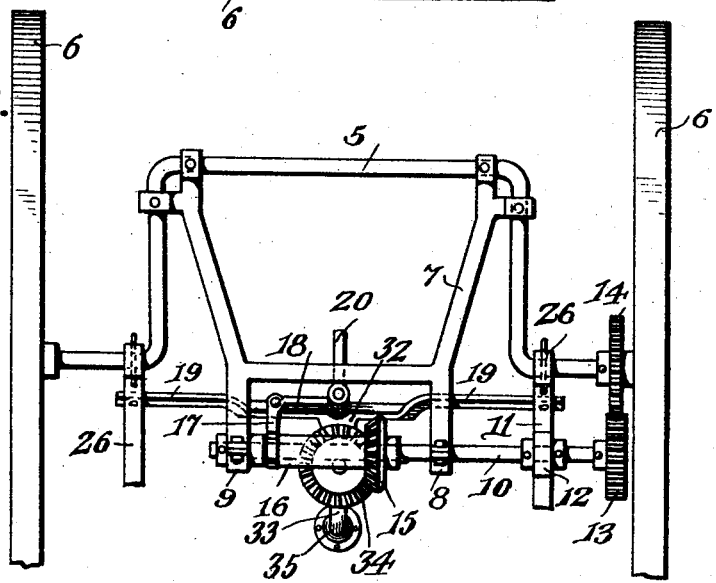
Figure 3 is a sectional view taken on line 3—3 of Figure 2.

Referring to the drawings in detail, the cotton chopper embodies an axle 5 which is the same type of axle as used on the ordinary straddle row cultivators, which axle is supported by the usual ground wheels 6. Secured to the axle 5, is a bracket 7 which is provided with bearings 8 and 9 respectively, in which the auxiliary shaft 10 is journaled.

The reference character 11 designates a hanger that is secured to the shaft 5 and is provided with a bearing 12 in which the shaft 10 is mounted. Secured to one end of the shaft 10 is a pinion 13 that meshes with the pinion 14 secured to the hub of the ground wheel 6, at one side of the frame. Splined on the shaft 10 is a beveled pinion 15 that has a collar 16 formed with a groove to receive the forked end 17 of the bell crank lever 18 which is pivotally supported on the bar 19 of the frame of the machine. Connected with the bell crank lever is a rod 20 that connects with the end 21 of the lever 22 which is pivotally supported on the arm 23 that is formed with a keeper 24 with which the sliding bolt 25 cooperates in holding the lever 22 in various positions of adjustment.

The frame also includes spaced rearwardly extended bars 26 that have bearings at their rear ends in which the axle 27 is journaled, the shaft being supported by the trailing wheels 28'. A bearing 27' is mounted on the rear axle and receives one end of the shaft 28' on which the arms 29 that carry the chopping blades 20, are mounted. Supported within the bearing 31 that is carried at the lower end of the hanger 32, is a shaft 33 to which the pinion 34 is secured, the pinion 34 meshing with the pinion 15 to receive rotary motion therefrom.

The shafts 28 and 33 are connected by means of the universal joint 35, so that rotary movement of shaft 33 is imparted to the shaft 28 to rotate the chopping blades.

Figure 2:
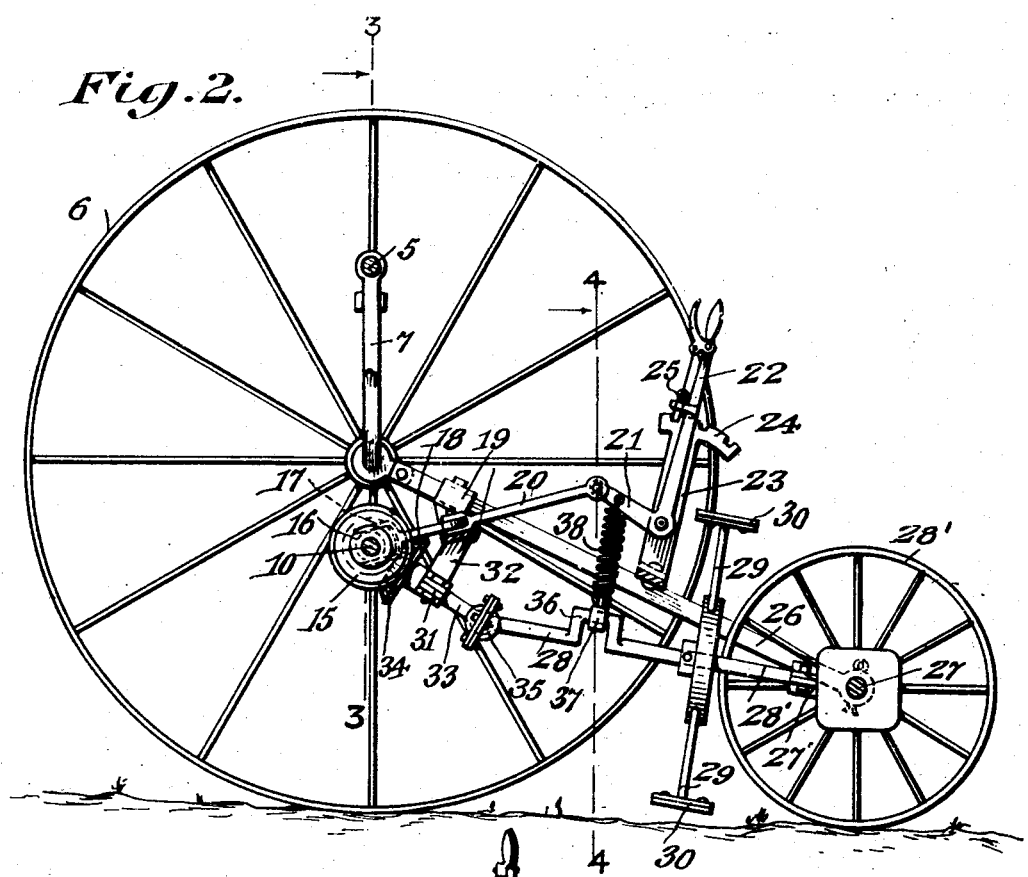
Figure 2 is a sectional view through the cotton chopper.
Figure 4:
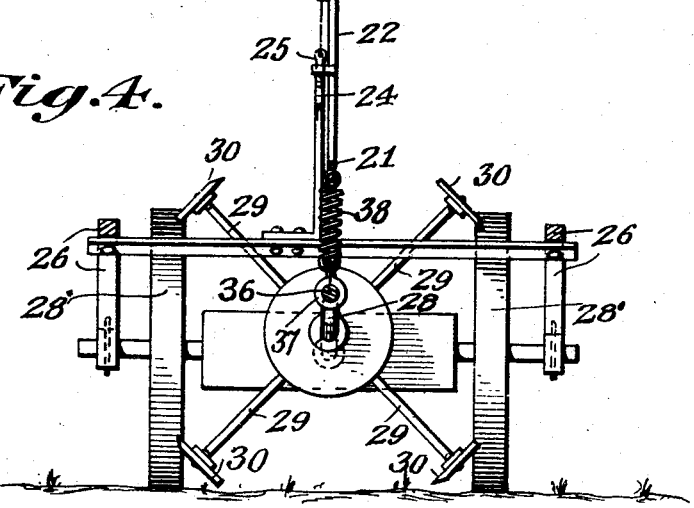
Figure 4 is a sectional view taken on line 4—4 of Figure 2.

As clearly shown by Figure 2 of the drawings, the shaft 28 is provided with an offset portion 36 on which the collar 37 is mounted, the collar being provided with an eye through which the lower end of the coiled spring 38 extends, the opposite end of the coiled spring 38 being formed into a hook and passed through an opening formed in the end 21 of the lever 22 so that when the lever 22 is pulled rearwardly to throw the pinion 15 out of mesh with the pinion 34, the spring 38 will be placed under tension exerting a pull on the offset portion 36 of the shaft 28, causing the shaft 28 to rotate to a predetermined position, or to a position as shown by Figure 4, wherein the chopping blades are held in positions above the ground surface over which the machine is moving.

It might be further stated that the rear ends of the bars 26 are pivotally connected to the ends of the axle 27, the forward ends of the bars being pivotally connected to the bearings 12 which constitute hangers. The hoes 30 which are driven by shaft 28', that is supported in a bearing attached to the axle 27, rotate or travel in a circle greater than the distance between the trailing wheels 28', the hoes being set to travel as close to the trailing wheels as possible, so that the trailing wheels 28 act as guards protecting the cotton and preventing the hoes from throwing clods of dirt onto the cotton which is left standing untouched by the hoes.

The trailing wheels are provided so that the hoes will cut at a uniform depth at all times regardless of the unlevel condition of the ground surface over which the machine is moving.

Thus it will be obvious that when the cotton chopper is used in the cultivation of cotton, the operator may by pulling the lever 32 throw the shaft 28 out of operation to stop the rotation of the member carrying the chopping blades, to the end that the chopping blades will miss the smaller blades, when it is desired to leave the soil uncultivated where the cotton may be thin.

By moving the lever 22 forwardly, the pinion 15 will again be thrown into operation to carry out the chopping result.

I claim:

1. In a cotton chopper, a frame, a main shaft supported by the frame, chopping blades rotated by the shaft, said shaft having an offset portion, a controlling lever, means actuated by the controlling lever for throwing the shaft into and out of operation, and a coiled spring connected with the lever and having connection with the offset portion of the shaft for moving the shaft to its initial position when the lever is operated to throw the shaft out of operation.

2. In a cotton chopper, a wheel supported frame, a shaft having an offset portion, mounted on the frame, chopping blades operated by the shaft, a collar mounted on the offset portion of the shaft, a coiled spring connected with the collar mounted on the offset portion, a controlling lever for throwing the shaft into and out of operation, and said coiled spring having connection with the controlling lever to move the shaft to its initial position when the shaft is thrown out of operation.

In testimony that I claim the foregoing as my own, I have hereto affixed my signature.

JOHN W. ALLEN.